(No Model.)
C. L. BASTIAN.
MAKING TUBULAR SWIVEL JOINTS.
No. 415,694.        Patented Nov. 26, 1889.
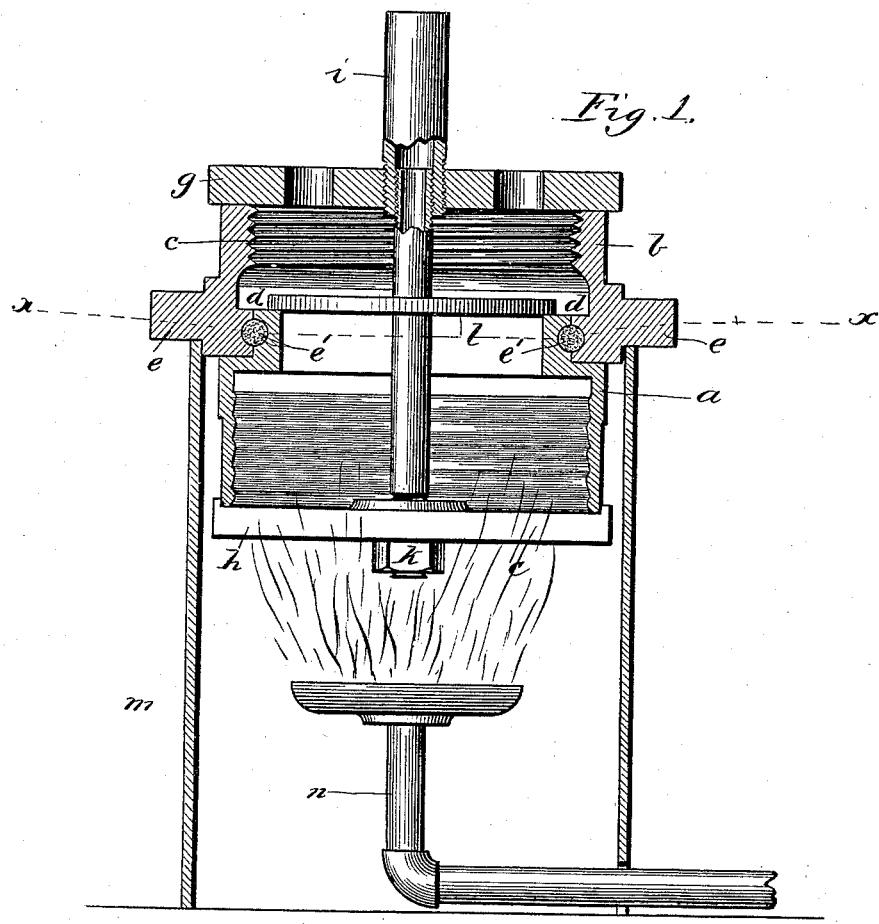
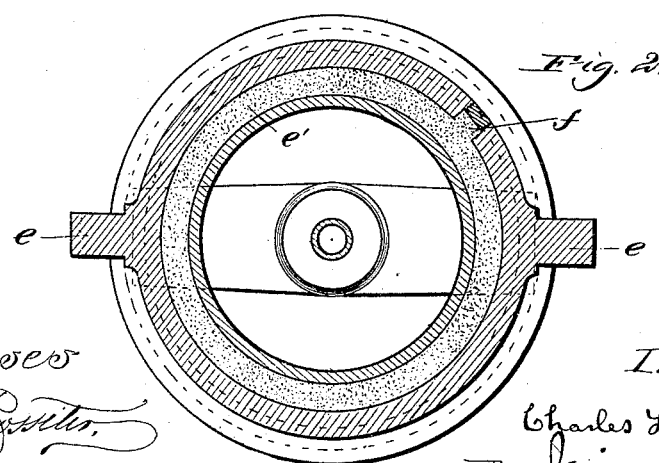
Witnesses        Inventor

UNITED STATES PATENT OFFICE.

CHARLES L. BASTIAN, OF CHICAGO, ILLINOIS.

MAKING TUBULAR SWIVEL-JOINTS.

SPECIFICATION forming part of Letters Patent No. 415,694, dated November 26, 1889.

Application filed September 30, 1889. Serial No. 325,476. (No model.)

*To all whom it may concern:*

Be it known that I, CHARLES L. BASTIAN, a resident of Chicago, in the county of Cook and State of Illinois, have invented certain new and useful Improvements in Making Tubular Swivel-Joints, of which the following is hereby declared to be a full, clear, and exact description, sufficient to enable others skilled in the art to which such invention appertains to make and use the same.

The invention relates to hose-couplings or like tubular sections having a swivel-joint connection between the members thereof; and it consists of certain improvements in the manufacture of the same, as hereinafter detailed, and more particularly pointed out in the claims at the conclusion of the description, whereby the tubular members are securely joined together in a simple and efficient manner, at the same time that they are free to swivel upon each other, as necessary.

Referring to the accompanying drawings, forming part of this description, and in which like letters of reference denote like parts of structure throughout, Figure 1 is a view in longitudinal section, and Fig. 2 a view in transverse section, (on line $x\ x$, Fig. 1,) of one form or apparatus conveniently used in the manufacture of swivel-joints according to my invention.

To employ my improvement in the construction of swivel-joints of hose-couplings, for example, the tubular members or sections $a\ b$, which together constitute the coupling, are made, as usual, with the outer terminals $c$ thereof threaded to receive the ends of the hose to which the coupling-sections are fixed. One of the members $b$ has the sunken seat $d$ to receive the rubber washer or packing, and carries the spanner-pins $e$, as usual. The contacting faces of the members $a\ b$ of the coupling are turned true and fitted to each other to form the swivel-bearing, as in ordinary practice. Opposite grooves in the adjacent edges of the two sections serve to receive the filling, as will presently be described, which locks the coupling members, while allowing them to swivel upon each other. As thus far detailed the construction does not differ from types of hose-coupling already upon the market, and consequently forms no part of the invention.

Heretofore the locking of the swivel-joint to prevent the separation of the coupling-sections was accomplished by thrusting an annealed wire through an opening formed above one of the semi-grooves, as at $e$, Fig. 3, into the space presented by the opposite grooves of the coupling, as the members thereof rested in place; or, instead of the wire lock, a series of spherical balls were dropped through the same opening until the groove referred to had been filled therewith. In either event the contacting faces of the tubular sections of the coupling needed to be fitted with great accuracy, because if the semi-grooves therein were in offset relation the wire or balls of sufficient diameter could not be admitted, nor would the members of the coupling swivel freely, as desired. Under the best conditions the diameter of the wire or that of the balls must be appreciably less than that of the groove into which they were set in order that the wire or balls might be admitted thereinto; but this difference in diameter rendered the locking of the joint shaky, and tended also to make the same insecure.

My invention designs to employ a filling of Babbitt or like cast metal, which will flow into and freely expand within the grooved seat of the joint to fill the same snugly and completely, so that the members of the coupling are tightly held together and yet are free to swivel.

In the practice of the invention, after the members of the coupling are true and fitted and the grooves cut at opposite points in the contacting faces thereof, one of the members $a$ is coated about its groove with whiting, lamp-black, or other material, which will serve to part the casting of Babbitt metal or the like when the same sets in contact with the coating. A convenient plan in practice is to hold the contact-face of the coupling $a$ over the flame of a lamp until the same is well covered with a coating of lamp-black; or if whiting be used it is reduced to the consistency of a thin paste with water, and then applied with a brush to the groove to be coated. The sections of the coupling, being now set together, are preferably so retained temporarily by means of a clamp-plate $g$ and bar $h$, which rest against the opposite ends of the tubular sections and are tightly held against them by means of the handle *i* and the set-nut *h*. A guard-plate *l* on the handle *i* rests lightly, as shown, upon the ledge of the tubular section *a*, and in such position serves to protect the companion section *b* from contact with the flame or heated gas to which the other section *a* is exposed. The sections thus clamped and retained are mounted, as shown, by the trunnion *e* upon the supporting-cap *m*, within which is introduced the Bunsen or like burner *n*. The burner being lit, the coupling is exposed to the flame for about a minute, more or less, thereby causing the section *a* to expand slightly, and thus tightly grip the companion section *b* and firmly closing the joint between them, so that the molten metal will not escape. The heating of the tubular section *a* relieves the molten metal from any tendency to chill prematurely, which might otherwise occur. The clamps are now removed from the members of the coupling and the charge of molten metal introduced through the hole *e*, so as to fill the entire circuit of the groove or channel formed in the opposite faces of the coupling members. When the metal sets, it adheres tightly to the semi-groove in the section *b*, while the section *a* on cooling contracts and draws away slightly from the filling *e'* the coating of whiting, lamp-black, or the like, allowing the coupling-section to part from the filling around the entire circuit without difficulty. The locking of the joint is thus completed, while the coupling members are free to turn or swivel upon each other in the usual way. By permitting the sprue-hole to remain filled in part with the metal used in casting, the filling is held more securely in its grooved seat, although where Babbitt metal is employed this adheres sufficiently to the brass of the coupling member *b* to be stoutly retained. A plug *f*, tapped into the sprue-hole, serves for finish and protection of the filling.

Instead of Babbitt metal, other composite metal melting at a temperature below that of the metal of the coupling may be employed.

The locking of the swivel-joint by the foregoing method is secured, even though the members of the coupling may not be accurately fitted, and in consequence the semi-grooves thereof be more or less in offset relation. Obviously the position and shape of the groove may be varied from what is shown by the drawings, and, again, the same sort of lock-filling may be employed for other purposes than to retain the swivel-joints of hose-couplings without departing from the spirit of my invention, which latter, in consequence, is not limited to the precise details or particular purpose heretofore assigned.

It is not essential to the practice of the invention that the particular form of heating apparatus shown by the drawings be employed, although such is simple and convenient for the purpose. Indeed, it is not requisite that the preliminary heating of the coupling-section be resorted to, since the parting-coat, if sufficiently thick when applied, will secure the necessary separation of the parts without dependence upon the contraction of the coupling member. So, also, instead of applying the coat to the member *a*, it may cover the groove in the companion member *b* instead. Under such circumstances it is merely necessary to bore or drill out the sprue-plug in the hole *e*, whereupon the coupling member *b* will be free to slip past or swivel upon the fillet, with the same result as if the member *a* were made to slip. Indeed, the parting-coat may be applied to the grooves of both sections or members, although this is unnecessary, and, besides, tends to reduce the thickness of the filling, so that the latter becomes looser and more rickety than if the filling were made adherent to one of the sections.

Having thus described my invention, what I claim as new, and desire to secure by Letters Patent, is—

1. The method of forming swivel-joints for hose-couplings, &c., which consists in applying a parting-coat to the annular groove between the tubular sections, slightly heating one of said sections as the same are *in situ*, filling the groove with molten metal, and permitting the metal to set therein, substantially as described.

2. The method of forming swivel-joints for hose-couplings, &c., which consists in applying a parting-coat to the annular groove between the tubular sections filling the groove with molten metal as the sections are *in situ*, and permitting the metal to set therein, substantially as described.

3. The method of forming swivel-joints for hose-couplings, &c., which consists in slightly heating one of the tubular sections as the same are *in situ*, filling the annular groove between said sections with molten metal, and permitting the same to set therein, substantially as described.

CHARLES L. BASTIAN.

Witnesses:
JAMES H. PEIRCE,
GEO. P. FISHER, Jr.